Feb. 25, 1941. C. H. RANDOLPH 2,232,729
ADHESIVE TAPE DISPENSER AND APPLIER
Filed March 13, 1939   5 Sheets-Sheet 1
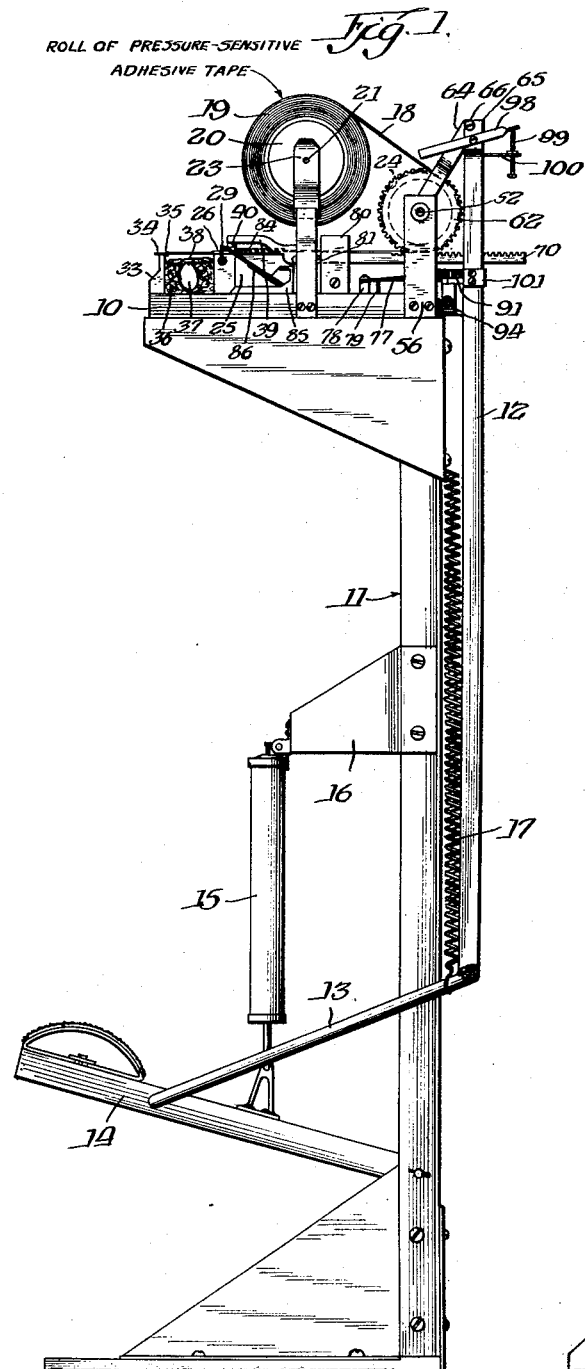
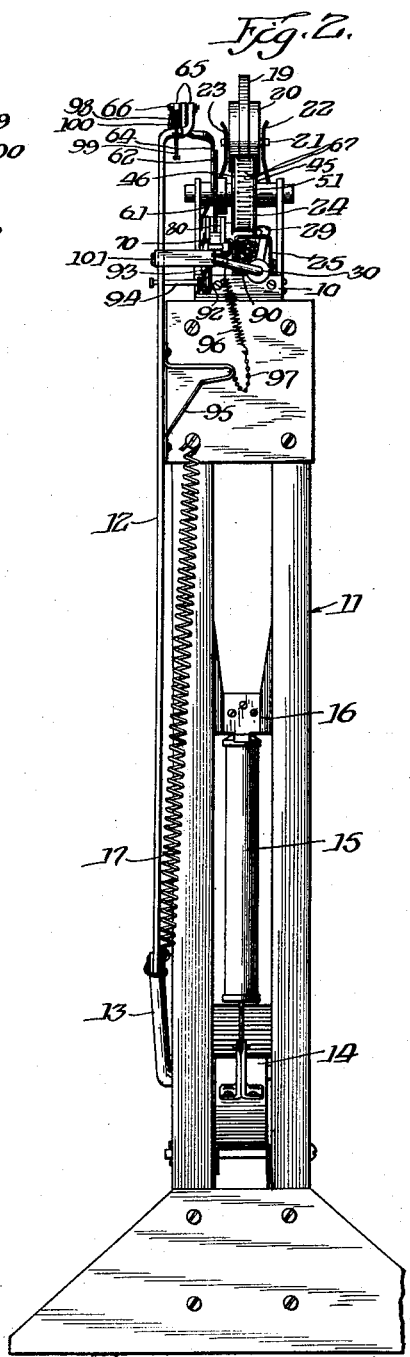
Inventor:
Chalmers H. Randolph
By: Paul Carpenter
Atty.

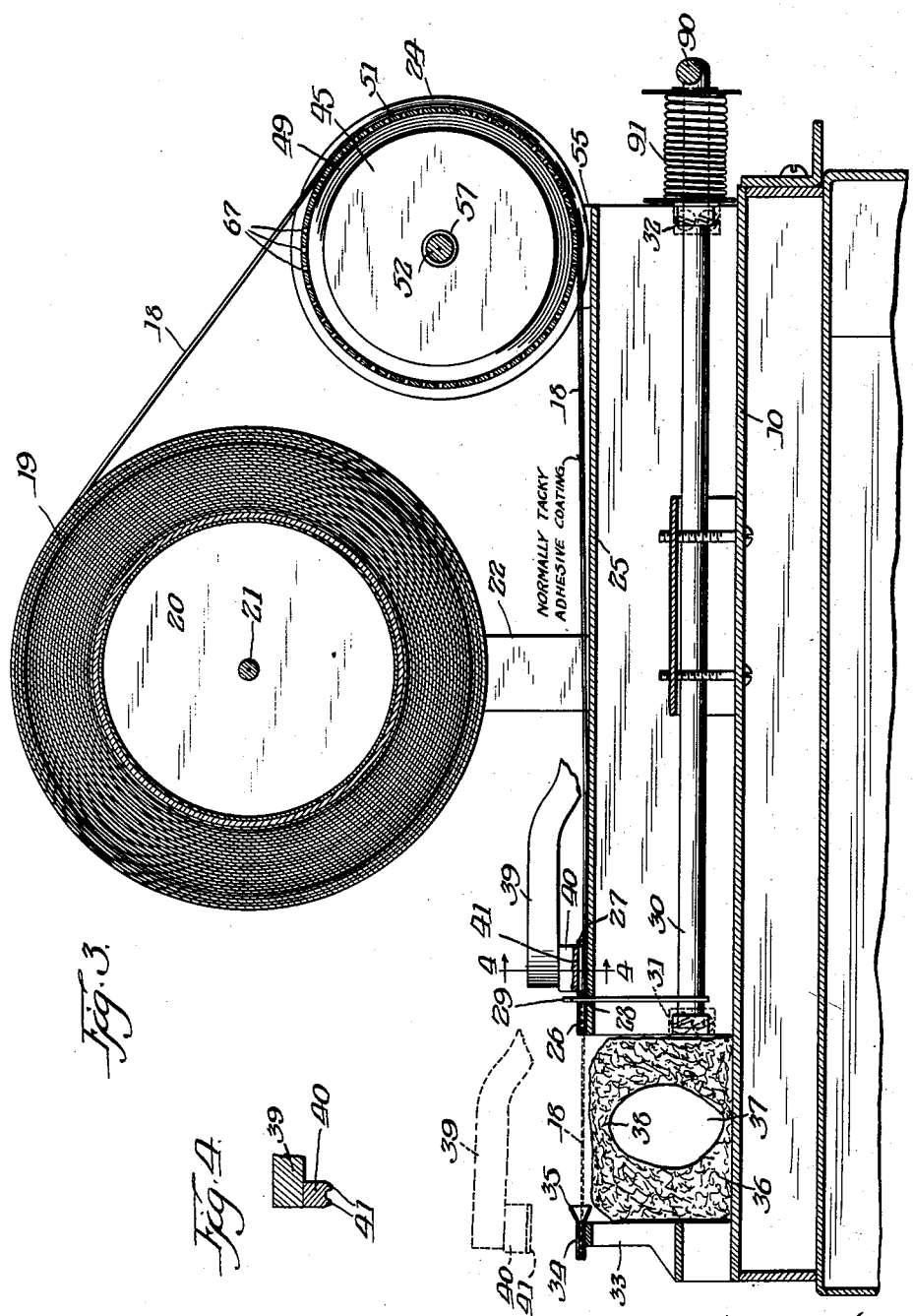

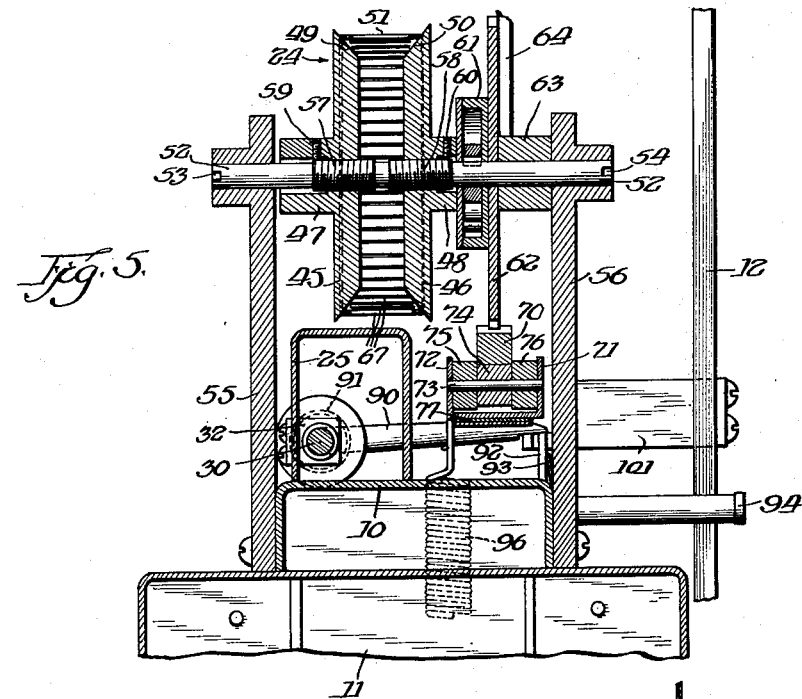

Feb. 25, 1941.   C. H. RANDOLPH   2,232,729
ADHESIVE TAPE DISPENSER AND APPLIER
Filed March 13, 1939   5 Sheets-Sheet 4
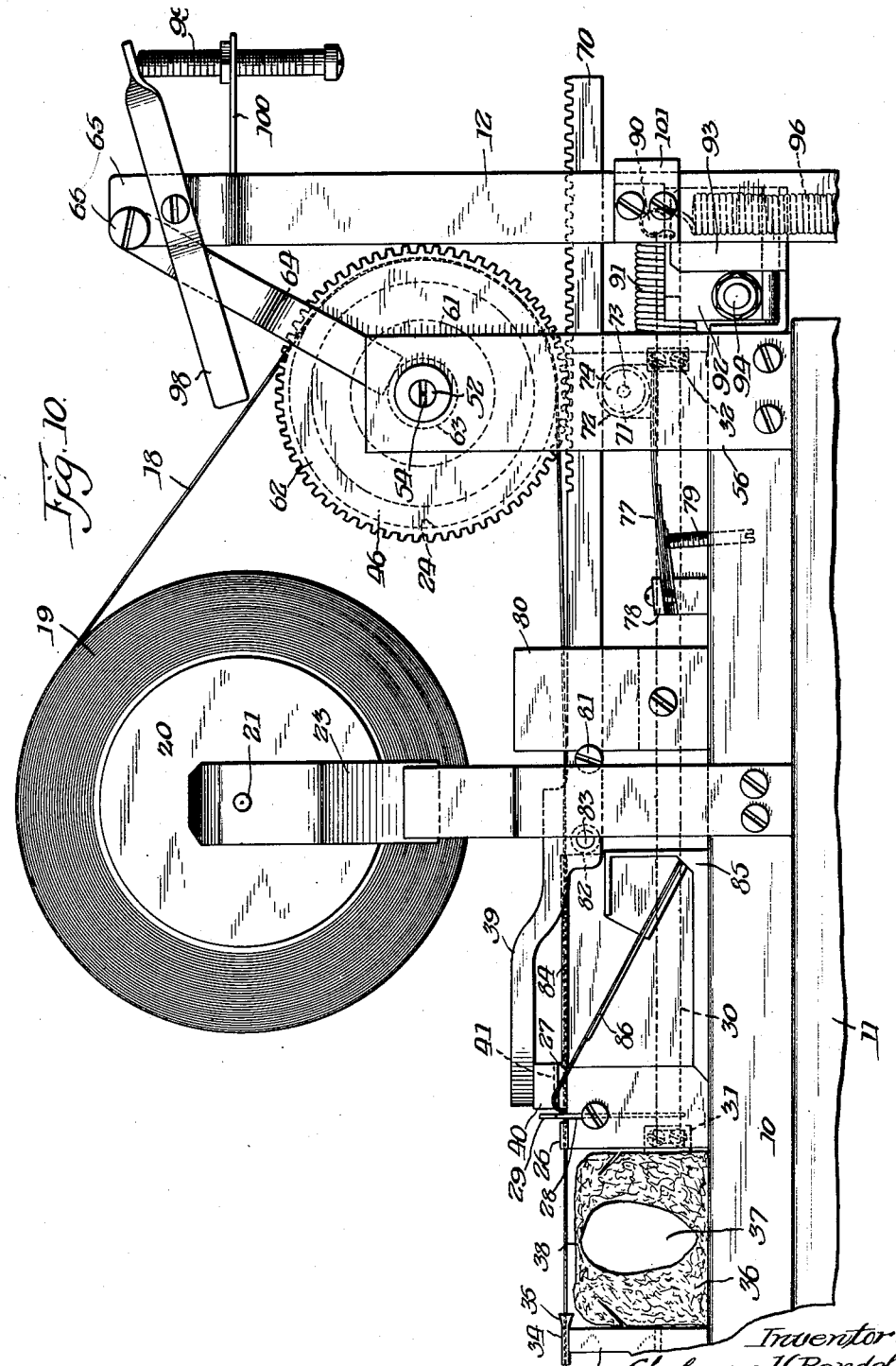
Inventor:
Chalmers H. Randolph.
By: Paul Carpenter   Atty.

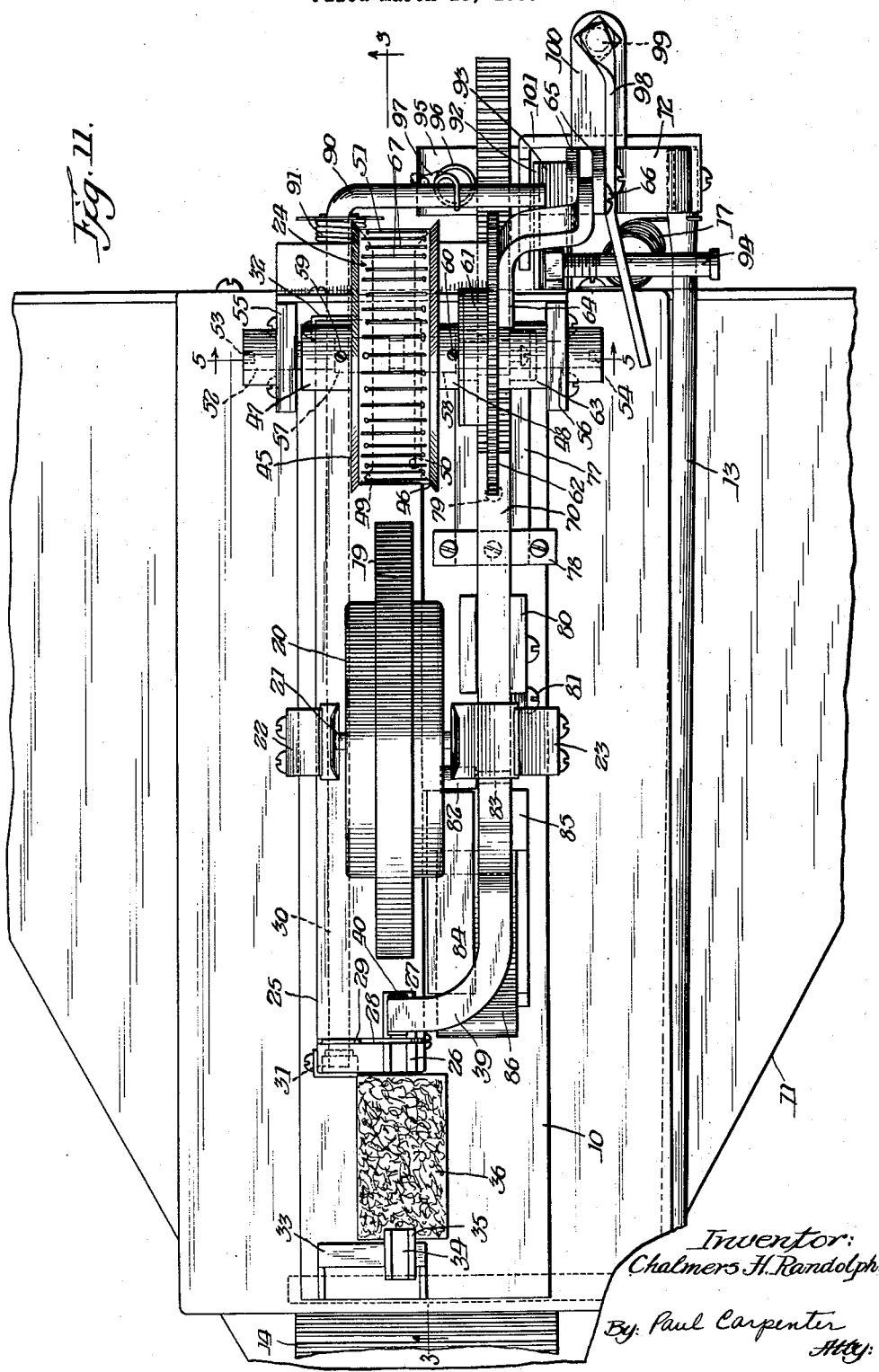

Patented Feb. 25, 1941

2,232,729

UNITED STATES PATENT OFFICE 2,232,729

ADHESIVE TAPE DISPENSER AND APPLIER

Chalmers H. Randolph, St. Paul, Minn., assignor to Minnesota Mining & Manufacturing Company, St. Paul, Minn., a corporation of Delaware Application March 13, 1939, Serial No. 261,536

9 Claims. (Cl. 216—29)

This invention relates to an adhesive tape dispenser and applier adapted to receive a roll of pressure-sensitive adhesive tape and automatically dispense a predetermined length of the tape in position for application to an article, and to apply the same to the article when the latter is moved into position to receive the tape. This operation may be rapidly performed so that an operator may readily and rapidly apply tape to a succession of articles of the same or different shapes without adjustment of the applicator being required.

As is well known in the adhesive tape art, a pressure-sensitive adhesive tape comprises a thin flexible backing having a normally tacky and pressure-sensitive adhesive coating. By "normally tacky and pressure-sensitive" it is meant that under ordinary atmospheric conditions the adhesive is stably in a condition such that it does not need to be activated by heat or solvents or otherwise prepared in order to secure good adherence to surfaces against which the adhesive coating (with its backing) may be pressed when used. Modern tapes of this type are available which are further characterized by having a unified adhesive coating possessed of such coherence in relation to adhesiveness and so firmly united to its backing that the adhesive tape may be stripped from smooth non-fibrous surfaces (not possessing special chemical affinity for the adhesive), to which it may have been temporarily applied, without offsetting of adhesive material. Hence such an adhesive coating may be termed "non-offsetting," and this expression designates an important physical or chemico-physical property or characteristic of the adhesive coating.

Such adhesive tapes may have backings of various kinds, including paper, cloth and resin films. However, I particularly contemplate the use of adhesive tapes having a clear, lustrous, transparent or opaque backing of a film of regenerated cellulose ("Cellophane"), cellulose acetate, cellulose nitrate, ethyl cellulose, etc. Pressure-sensitive adhesive tapes of this kind are well known and readily available on the market under the trade-mark "Scotch."

The adhesive tape may be transparent so as not to conceal the printing, decoration or contents of packages. The tape backing may be printed or marked, either on the face or on the side beneath the adhesive coating, for advertising, identification or decorative purposes.

Various illustrative uses of the machine are mentioned in the following description.

In the accompanying drawings:

Figs. 1 and 2 are side and rear elevation views of the entire machine;

Fig. 3 is a longitudinal central vertical section of the upper portion of the machine, including the dispensing and applying machine proper, taken on the line 3—3, Fig. 11;

Fig. 4 is a transverse vertical section of the end of the tape guide arm, taken on the line 4—4, Fig. 3;

Fig. 5 is a transverse vertical section, showing the construction of the tape pull-off drum and drive, taken on the line 5—5, Fig. 11;

Figs. 6, 7, 8 and 9 are side elevation views illustrating operation of the tape applicator;

Fig. 10 is an enlarged side elevation of the tape dispensing and applying means proper; and Fig. 11 is a plan view.

Referring to Figs. 1, 2 and 3, the tape dispensing and applying mechanism is mounted on a rectangular bed 10 which is secured to the top of supporting stand 11. The mechanism is actuated by a vertical connecting rod 12 located at the back of the stand, the lower end of which is rigidly secured to the rear end of slanting connecting rod 13 which is pivotally connected to foot treadle lever 14. Upward movement of the foot treadle and connecting rods, during the return part of the cycle of operation, is slowed by vertical check dash-pot 15 which is connected to treadle 14 and to stand bracket 16. A long vertical coil spring 17 is connected to the upper part of the stand and to the rear end of slanting connecting rod 13, to return the connecting rods and treadle after the latter has been depressed and the operator's foot has been removed, and also serves to prevent too rapid downward movement.

The adhesive tape 18 is fed from a roll of tape 19 located above the middle of bed 10, the tape roll being removably and rotatably supported by concentric core 20 having an axle 21, the projecting ends of which are journaled in vertical spring holders 22 and 23 supported from the sides of the bed. The tape is unwound from the top of the roll downwardly and rearwardly and passes over and under pull-off drum 24, located at the rear of the bed and actuated by connecting rod 12 in a manner subsequently described. The normally tacky and pressure-sensitive adhesive coating is on the inner surface of the tape backing and adheres to the pull-off drum, so that rotation of the latter serves to unwind the tape roll without slippage between tape and drum. The adhesive coating is non-offsetting and hence the tape strips from the drum, in moving forward from the lower surface thereof, without leaving a material residue of adhesive thereon. After stripping off from the bottom surface of pull-off drum 24 as the latter rotates, the adhesive tape 18 is impelled forwardly, moving along and above longitudinal table 25, which is fastened to bed 10.

Before describing the operating mechanism in detail, the general plan of operation will be indicated.

Referring particularly to Fig. 3, longitudinal table 25 extends forwardly to near the front of the machine. Channel shaped tape guides 26 and 27, are located at the front end of the table, extending rearwardly in alignment with each other, and of a width slightly greater than the tape, and having inwardly projecting top edges. They are spaced apart and lie on either side of transverse slot 28 located in the top of table 25 (see Fig. 11). A cut-off knife 29 extends upwardly through the slot, being carried by spindle 30 which extends longitudinally beneath the table and is journaled in bearings 31 and 32. Spaced from the front end of table 25, by a distance approximating the desired length of tape to be dispensed, is a support 33, on the top of which is guide 34 in alignment with guides 26 and 27. This guide likewise is channel shaped, having inwardly projecting top edges, and is flared in the rearward direction forming lips 35 facing guide 26. In the open space between support 33 and table 25, there is located a flexible and resilient forming die 36 used for shaping and applying the adhesive tape about various articles, as desired. This may be made in various ways, but the preferred form is a sponge rubber block resting on bed 10 and having its top just below the guides. As shown, it is cored out transversely to provide a large opening 37 bridged over by the top portion 38 of the block. The spaced-apart side portions or supports of sponge rubber are free to bend inwardly when an object is pressed against the bridge portion to facilitate conformation of the tape applying die to various articles.

At the beginning of a cycle of operation, the front end of adhesive tape 18, lying above table 25, rests in guide 27. The normally tacky adhesive coating forms the upper surface. Guide arm 39, having gripper 40 secured to and below its front end, has been previously brought into position, with the gripper resting on the end of the adhesive tape in guide 27. As shown in Fig. 4, the bottom of the gripper is cut away to provide projections 41, and these contact the adhesive coating of the tape with sufficient contact area to securely hold the tape, but facilitate subsequent separation. When the operator presses the foot pedal downward, the downward moving connecting rod 12 causes the pull-off drum 24 to rotate and guide arm 39 to move forward (by means of a driving mechanism to be later described). The tape is impelled forward and its end is threaded through guide 26, thence carried across die 36, and is threaded into guide 34; the guide arm 39 and gripper 40 moving forward at a rate slightly greater than that at which the tape is fed from the pull-off drum, so as to maintain the tape under tension. At this point the guide arm is suddenly raised and the gripper pulls free from the adhesive coating, the tape being held in the guides by the inwardly projecting top edges thereof. Spindle 30 rotates so as to cause knife 29 to move in transverse slot 28 with a snapping movement to cut the tape between guides 26 and 27 just as the guide arm starts to rise. The sudden blow of the knife against the tape helps to free the end of the tape from the gripper, and cutting is facilitated by the fact that the tape is still under tension at the moment of cutting. The knife snaps back to original position, and the guide arm is gradually restored to initial position, as the foot treadle rises, following removal of the operator's foot, so that they will be ready for another cycle of operation.

In the form shown, the foot treadle 14 is located so that it will meet the base of the supporting stand when connecting rod 12 has completed the desired stroke (i. e., when the tape has been severed and the guide arm raised), thus stopping further rotation of the pull-off drum. It will be evident that an adjustable stop can be provided, if desired, to limit the down stroke.

The severed piece of adhesive tape, thus dispensed, lies between guides 34 and 26, to which it adheres sufficiently to hold it in position above forming die 36, ready for application. The operator then takes the article to which the tape is to be applied and with a quick movement pushes it down on the tape and into the forming die. The latter presses the tape about and against the article, causing the tape to adhere in the desired manner. The article is then removed.

Figs. 6, 7, 8 and 9 illustrate the application of the tape to differently shaped articles. In Fig. 6 the wrapping of the tape about a cylindrical object 40 to form a tab is shown. Thus flowers, such as roses, may be provided with individual identifying tabs on the stems to indicate variety, etc. In Fig. 7 there is shown the application of the tape as a seal about the edge of a flat object 41, such as a folder, envelope, flat wrapped package, etc. Fig. 8 shows the tape applied around the edge of a box-shaped article 42. Fig. 9 shows the sealing of the end of a filled bag 43 having the top folded over upon itself as indicated at 44.

In each case the cored opening 37 of the die permits the bridge portion 38 to be readily depressed and to wrap about the article, pressing the tape against it. The resilient nature of sponge rubber causes the bridge portion to conform closely to the article, whatever its shape, and to press the tape firmly against it. Inward bending of the spaced-apart side portions of the die, which serve as supports for the bridge portion, facilitate conformation of the tape applying die to the article (see Figs. 6, 7, 8 and 9).

The following is a description of mechanism illustrative of means for actuating the tape dispensing means previously described, and also indicates in more detail a preferred construction of the latter.

Pull-off drum mechanism

Referring particularly to Fig. 5, the pull-off drum is comprised of two spaced-apart disks 45 and 46 facing each other and mounted on integral hubs 47 and 48. The disks are of substantial thickness and the outer portions are bevelled inwardly forming opposed bevel surfaces 49 and 50. A slotted metal rim 51 lies between the disks and is held in position by the bevel surfaces. This rim is somewhat wider than the tape and constitutes the drum surface. A common axle 52, having end slots 53 and 54, is journaled in and through uprights 55 and 56, the latter being located on either side of bed 10, the positioning being such that the axle extends transversely and the pull-off drum is located to the rear of and below the roll of tape when the latter is in position. The axle is threaded outwardly from the center of the drum with right and left handed threads, forming right and left handed threaded portions 57 and 58, upon which are screwed the disk hubs 47 and 48 which are correspondingly threaded. The disk hubs are normally locked to the axle by means of set screws 59 and 60, preventing turning.

Also located on axle 52, adjacent to hub 48, is one-way roller clutch 61, and adjacent cogwheel 62. The clutch is locked to the axle and the cogwheel is free to turn on the axle, but is secured to the housing of the clutch. The clutch acts as a one-way coupling between the cogwheel and the axle. A spacing collar 63 is located on the axle between the cogwheel and upright 56. A crank 64 is secured to the outer side of the cogwheel.

Referring particularly to Figs. 2 and 10, the upper end of connecting rod 12 (which is linked to the foot treadle terminates in a yoke 65 lying to the rear and above the pull-off drum mechanism. The yoke is provided with a cross pivot bolt 66 to which is pivoted the outer end of crank 64. Downward movement of the connecting rod, when the foot treadle is depressed, thus causes a downward pull on the crank, turning the cogwheel and casing of the clutch, thus turning the axle so as to rotate the pull-off drum in a direction to pull adhesive tape from its roll. But since the clutch is of the one-way type, an upward movement of the connecting rod and crank, during the return portion of an operating cycle, will have no effect on the axle and pull-off drum.

The construction permits of adjusting the diameter of the pull-off drum, that is, the diameter of rim 51 which carries the tape. As indicated in Fig. 11, this rim is provided with a series of staggered transverse slots 67, made by drilling holes in alternating position near the edges of the rim and slotting the rim from each hole to near the opposite edge. The rim is made of resilient metal, such as spring bronze or spring steel and the slots render it readily expandible. The resiliency of the metal causes the rim to tend to spring back to a smaller diameter, thus causing the rim to firmly seat itself between the bevelled surfaces 49 and 50 of disks 45 and 46. By moving the disks closer together, the rim will be forced outwardly due to the coning action of the bevelled surfaces of the disks. This is accomplished by unscrewing set screws 59 and 60, and turning the disks on the axle, the latter being held from rotation by inserting a screw driver in one of the end slots. Since the axle is right and left hand threaded, turning the disks together around the axle will cause them to move toward or away from each other as desired. When the rim has been expanded to the desired diameter, the set screws are tightened, thus locking the disks to the axle.

Such adjustment of the diameter of the rim is desired in order to accurately control the length of tape dispensed by any given degree of rotation, so that the tape will be made to move forwardly from the lower surface at a rate slightly less than the rate of forward motion of guide arm 39. The rim is made up slightly undersize, and when in position is expanded to correct size so that there will be a proper tension on the tape as it is dispensed.

Guide arm mechanism

The guide arm 39 (carrying gripper 40 which rests in guide 27 at the beginning of a tape dispensing cycle) extends toward the near side of the bed and curves rearwardly and downwardly to join horizontally moving longitudinal rack 70. See especially Figs. 10 and 11. The rear half of the rack is toothed and meshes with cogwheel 62, which rotates on pull-off drum axle 52 as previously described. The rack lies just below the plane of the top of tape table 25. The rack is yieldingly held in engagement with the cogwheel, and is guided, by a roller guide 71 (see Fig. 5) comprised of a yoke 72 having a cross axle 73 upon which is mounted a central roll 74, having a width slightly greater than the rack width and bearing against the rack, and two side rolls 75 and 76 of somewhat greater diameter than the central roll and serving to prevent sidewise displacement of the rack. The axis of the roller guide is parallel to and directly beneath the axis of the cogwheel. The roller guide is supported on the end of loaded longitudinal leaf spring 77, the other end of which is held by post 78, and the loading of the spring is adjusted by screw 79.

The forward part of the rack is supported and guided by U-guide 80, which permits the rack to rock upwardly. A stop screw 81 positioned in the side of the rack, forwardly of the U-guide, limits rearward movement so as to prevent the rack from drawing the guide arm back of the position desired at the beginning of a cycle.

At the forward end of the rack, behind the guide arm, there is located a cam roller 82 extending transversely and inwardly from the side of the rack, and having a journal 83 journaled in the rack. A hold-down guide 84 in the form of a flat horizontal plate, serving as a flat cam, is located just above roller 82. The rear edge is in front of the roller and the front edge is positioned such that the roller will be able to move upwardly when the rack has moved forward the desired distance of travel of the guide arm. A spring holder 85 is located below the rear part of the hold-down guide, from which a leaf spring 86 projects upwardly at an angle. In normal position, the upper end of this spring projects upwardly past the front edge of the hold-down guide and terminates in a down-curving end.

The operation of the guide-arm mechanism is as follows: At the beginning of a dispensing cycle the rack 70 is in retracted position so that gripper 40 rests on the end of the tape in guide 27. The downward movement of connecting rod 12 (resulting from depressing the foot pedal) pulls crank 64 downward and rotates cogwheel 62 in a clockwise direction, thus causing rack 70 and guide arm 39 with its gripper 40 to move horizontally forward. When gripper 40 has threaded the end of the tape into guide 34, cam roller 82 will have reached the forward edge of hold-down guide 84 and will be snapped upwardly by spring 86, causing the rack to rock upwardly (pivoting on cogwheel 62 and roller guide 71), thus jerking up guide arm 39 and releasing the tape end from the gripper.

The effective diameter of cogwheel 62 is slightly greater than the diameter of pull-off drum rim 51. Hence the tape will be fed from the drum at a slightly lower rate than that of the forward moving gripper 40 to which the end of the tape is stuck. This maintains the tape under tension, facilitating threading the tape through guides 26 and 34 and the severing of the tape. The difference is not great enough to break the tape, especially as the tape can slide back on the face of the gripper. The adjustability of the rim diameter, previously described, permits of proper adjustment to secure the desired result.

The return part of the cycle, which starts when the operator's foot is raised from the treadle, involves a reverse rotation of cogwheel 62 produced by the upwardly moving crank and connecting rod. This retracts rack 70 and guide arm 39 in raised position due to cam roller 82 riding back on the upper surface of guide plate 84 until it reaches the rear edge of the latter, whereupon the roller drops over the edge bringing the rack and guide arm back to horizontal position with gripper 40 resting on the end of the tape in guide 27. Further retraction is prevented by stop bolt 81.

*Knife actuating mechanism*

Spindle 30, which carries cut-off knife 29, projects rearwardly beyond rear bearing 32 and then bends so as to project toward the near side of the machine, at a slight angle upward from horizontal when the knife is in upright ready position, forming crank arm 90. See Figs. 3 and 5. A coil spring 91 encircles the spindle between bearing 32 and crank arm 90 and is loaded by rotation of the spindle in a direction moving the knife to cut the tape. The end of the crank arm is held in raised position by catch 92, a vertical plate hinged at the bottom so that it can pivot outwardly about its lower edge. This catch is yieldingly held in normally vertical position by flat finger spring 93. Projecting outwardly from the face of the catch plate is trigger stud 94. See Figs. 2, 5 and 10.

Transverse bracket 95 extends inwardly from connecting rod 12, being located a substantial distance below the top of stand 11. A coil spring 96 has one end fastened to crank arm 90 and hangs downwardly with its lower end connected to bracket 95 by chain 97, of such length that the spring is not loaded until connecting rod 12 has nearly completed its downward movement. See Fig. 2. The near or outer arm of yoke 65 at the top of connecting rod 12 carries a lever 98 pivoted thereto, the forward end of which lies above trigger stud 94 so as to engage the latter upon downward movement of the connecting rod. The position of the lever is adjusted by vertical screw 99, the upper end of which bears against the rear end of the lever, the screw being threaded through bracket 100. This permits tripping the trigger stud at the correct moment in relation to the operation of the tape dispensing mechanism. A strap 101 extends from connecting rod 12 in position to engage and raise crank arm 90 during the return part of the cycle.

In operation, as connecting rod 12 nears the end of its downward travel, during the dispensing part of a cycle of operation, spring 96 is pulled down and loaded, exerting a downward force on crank arm 90. Lever 98 then pushes down trigger stud 94 (at the point when the tape guide arm has threaded the tape into guide 35 and is just ready to rise) pulling out catch 92, thus permitting crank arm 90 to snap down and rotate the knife-carrying spindle 30 so as to cause knife 29 to snap against the tape and sever it. In rotating the spindle, spring 91 is loaded and this spring returns the spindle and crank arm to approximate initial position during the initial part of the upward movement of connecting rod 12. Near the completion of the latter's upward movement, during the return part of the cycle, strap 101 positively positions crank arm 90 so that catch plate 92 will be certain to snap back in upright position to hold the crank.

It will be understood that the machine may be power-driven, and that it may be used in conjunction with means for mechanically and automatically introducing and removing the articles to which the tape is applied.

It will be understood that the foregoing detailed description has been given for purposes of illustration and not limitation.

What I claim is as follows:

1. A tape dispenser and applier for pressure-sensitive adhesive tape, comprising a pair of spaced-apart supports adapted to releasably hold the ends of a piece of such tape, forming means positioned and adapted to press the piece of tape about and against an article when pressed against the tape and into engagement, a holder for a roll of said tape, means for removing tape from the roll, reciprocating means for carrying and positioning the end portion of the withdrawn tape between said supports, and means for cutting off the piece of tape thus positioned ready for application to an article.

2. A tape dispenser and applier according to claim 1, in which the forming means comprises a resilient tape-applying die positioned between the tape supports, formed of a yieldable and resilient material of the nature of sponge rubber and having a bridge portion and spaced-apart supports therefore of said material, said last-mentioned supports being free to bend inwardly when an object is pressed against the bridge portion to facilitate conformation of the tape to the article.

3. A tape dispenser and applier according to claim 1, in which the means for removing the tape from the roll comprises a drum adapted and positioned to receive tape from the roll and have the tape pass around the drum with the adhesive side of the tape in gripping contact therewith, and driving means associated therewith to turn the drum whereby rotation of the drum will pull tape from the roll.

4. A tape dispenser and applier according to claim 1, in which the means for carrying and positioning the end portion of the withdrawn tape comprises a member having a gripper element adapted to releasably grip the end of the tape by being pressed in contact with the adhesive side thereof and sticking thereto, means for moving said member and element as tape is withdrawn from the roll so as to position the end portion of the tape between the supports and maintain the tape under tension while being positioned, and means for releasing the gripper element from the end of the tape when the tape is positioned between the supports.

5. In a tape dispenser for pressure-sensitive adhesive tape, a holder for a roll of tape, a pull-off drum mounted in alignment with the roll for rotation on an axis parallel to the axis of the roll, said pull-off drum being adapted to have tape from the roll pass around and in adhesively gripping contact therewith, one-way driving means for rotating the drum in one direction only to withdraw tape from the roll, a gripper element adapted to grip the end of the withdrawn tape by being pressed into the contact with the adhesive side thereof, means for moving the gripper element into engagement with the end of the tape following a dispensing operation, and means for moving the gripper element so as to pull tape under tension from the pull-off drum during rotation of the latter.

6. A tape dispenser for pressure-sensitive adhesive tape comprising a holder for a roll of such tape, a rotatable pull-off drum for removing tape from the roll, a gripper element for holding the end of the tape and withdrawing it from the pull-off drum, a rack to which the gripper element is connected, gear driving means for the rack, a one-way driving connection between said gear driving means and said pull-off drum whereby the rack can be moved in both directions but the pull-off drum only in a direction to remove tape from the roll, and the pull-off drum and gear driving means being relatively adjusted so that the gripper element will withdraw tape under tension from the pull-off drum as the latter rotates.

7. A tape dispenser for pressure-sensitive adhesive tape comprising a holder for a roll of such tape, tape removal means for removing tape from the roll and a table for receiving the tape from said means, a rack, a gripper element carried by the rack and overlying the tape on the table, said gripper element being adapted to grip the tape by sticking to its adhesive surface, means for driving the rack to advance the tape under tension along the table as it is withdrawn and to retract the rack following a dispensing operation, guide means for receiving the tape underlying and held by the gripper to permit the gripper to be pulled free when the tape has been advanced a predetermined distance, means for rocking the rack when it has advanced the tape a predetermined distance, so as to free the gripper from the tape, means for directing the rack to normal position following retraction so that the gripper element will again be in contact with the tape, and means for driving the tape removal means so that tape is removed from the roll when being advanced along the table in the manner described.

8. In an adhesive tape dispenser, means for removing tape from a roll thereof, reciprocating gripper means for engaging the end of the tape and advancing it so as to position a predetermined length of the tape, including mechanical means for releasing the end of the tape after positioning, and means for cutting off the predetermined length of tape ready for application to an article.

9. In an adhesive tape dispenser and applier, a pair of spaced-apart supports adapted to receive and releasably hold a predetermined length of the tape, a resilient tape-applying die positioned between said supports so as to underlie the tape and be in close proximity thereto, formed of a yieldable and resilient material of the nature of sponge rubber and having a bridge portion and spaced-apart supports therefore of said material, said last-mentioned supports being free to bend inwardly when an object is pressed against the bridge portion to facilitate conformation of the tape applying die to the article.

CHALMERS H. RANDOLPH.